United States Patent [19]

Sellstrom et al.

[11] Patent Number: 4,766,186

[45] Date of Patent: Aug. 23, 1988

[54] EPOXY ADHESIVE

[75] Inventors: Kathy B. Sellstrom, Pflugerville; Harold G. Waddill, Austin, both of Tex.

[73] Assignee: Texaco Inc., White Plains, N.Y.

[21] Appl. No.: 92,855

[22] Filed: Sep. 3, 1987

[51] Int. Cl.$^4$ ...................... C08G 59/04; C08L 63/02
[52] U.S. Cl. .................................... 525/532; 525/523
[58] Field of Search ......................................... 525/532

[56] References Cited

U.S. PATENT DOCUMENTS

| | | | |
|---|---|---|---|
| 4,051,195 | 9/1977 | McWhorter | 528/121 |
| 4,179,552 | 12/1979 | Waddill | 525/526 |
| 4,187,367 | 2/1980 | Waddill | 528/94 |
| 4,383,090 | 5/1983 | Slocki et al. | 528/120 |
| 4,588,788 | 5/1986 | Emmons et al. | 525/530 |

Primary Examiner—John C. Bleutge
Assistant Examiner—Robert Sellers
Attorney, Agent, or Firm—Jack H. Park; Kenneth R. Priem; Richard A. Morgan

[57] ABSTRACT

The invention is an epoxy resin adhesive composition. The composition comprises:

A. An epoxy resin component comprising:
 1. 72 to 104 pbw of a vicinal polyepoxide having an average of at least 1.8 reactive 1,2-epoxy groups per molecule,
 2. 8 to 16 pbw of trimethylolpropanetriacrylate
 3. 10 pbw of a polyoxypropylene diureide of 2000 to 3000 molecular weight; and B. A curative component comprising:
 1. a curing amount of triethyleneglycol diamine or tetraethyleneglycol diamine; and
 2. an effective cure acclerating amount of piperazine, N-aminoethylpiperazine or mixture thereof.

The fast curing adhesive offers high lap shear strength and relatively high peel strength.

4 Claims, No Drawings

EPOXY ADHESIVE

BACKGROUND OF THE INVENTION

1. Field of the Invention

The invention relates to a two part epoxy resin adhesive formulation.

2. Description of Other Relevant Materials in the Field

Curing epoxy resins with amino containing compounds to form adhesives is known in the art.

U.S. Pat. No. 4,187,367 to H.G. Waddill teaches an epoxy resin adhesive comprising an epoxy resin, a polyether diureide having terminal ureido or monosubstituted ureido groups and having a molecular weight of about 2000 to 3000 and an aminoalkylene derivative of polyoxyalkylenepolyamine.

U.S. Pat. No. 4,051,195 to W. F. McWhorter teaches curable epoxy resin compositions comprising (1) a blend of an epoxide resin and a polyacrylate or polymethacrylate ester of a polyol wherein the ester contains more than one terminal acrylate or methacrylate and (2) an aliphatic polyamine curing agent. The weight ratio of epoxide resin:ester is 100:5 to 100:100. The aliphatic polyamine is incorporated into the resin composition in a specified amount. The epoxy resin compositions are said to cure rapidly even at low temperature and are useful as coatings and adhesives.

U.S. Pat. No. 4,528,345 to H. G. Waddill teaches a method for making weather-resistant epoxy coatings. The method comprises prereacting a cycloaliphatic diepoxide resin with aminoethylpiperazine or a mixture of aminoethylpiperazine and polyoxyalkylenepolyamine in an amount which is balanced to give the maximum level of primary amine reaction without yielding an excessively viscous reaction product. The prereacted product is reacted with a curing amount of a polyoxyalkylene polyamine and an accelerator.

U.S. Pat. No. 3,875,072 to H. G. Waddill teaches an accelerator for curing epoxy resins. The accelerator comprises piperazine and an alkanolamine in a weight ratio of 1:8 to 1:1.

U.S. Pat. No. 4,195,153 to H. G. Waddill teaches a non-crystallizing accelerator for curing curing epoxy resins. The accelerator comprises a mixture of N-aminoethylpiperazine and triethanolamine.

U.S. Pat. No. 4,189,564 to H. G. Waddill teaches a non-crystallizing accelerator for curing epoxy resins. The accelerator comprises a mixture of piperazine, N-aminoethylpiperazine and triethanolamine. The product comprising 65 to 80 wt% triethanolamine, 10 to 20 wt% piperazine and 5 to 10 wt% N-aminoethylpiperazine is sold commercially as Accelerator 399 by Texaco Chemical Co. The accelerator is said to be synergistic for accelerating the curing of a polyglycidyl ether of a polyhydric phenol cured with a polyoxyalkylene polyamine at ambient or elevated temperatures. Such amines include polyoxypropylene diamines of the formula:

$$NH_2CH(CH_3)CH_2[OCH_2CH(CH_3)]_xNH_2$$

wherein x ranges from 2 to 40.

These diamines may be synthesized according to U.S. Pat. No. 3,654,370 to E. L. Yeakey which teaches a method comprising a nickel, copper and chromium catalyst for aminating polyols. These diamines were originally taught in U.S. Pat. No. 3,462,393 to Legler.

U.S. Pat. No. 3,496,138 to R. F. Sellers and C. F. Pitt teaches curing diepoxides with polyglycol diamines. Suitable glycol precursors to these diamines include ethylene glycol, diethylene glycol and polyethylene glycol.

SUMMARY OF THE INVENTION

The invention is an epoxy resin adhesive composition. The epoxy component comprises: a mixture of (1) 72 to 104 parts by weight of a vicinal polyepoxide having an average of at least 1.8 reactive 1,2-epoxy groups per molecule (2) 8 to 16 parts by weight trimethylolpropane triacrylate, and (3) 5 to 15 parts by weight of a polyoxypropylene diureide having a molecular weight of 2000 to 3000. The curative component comprises: (1) a curing amount of either triethyleneglycol diamine or tetraethyleneglycol diamine and (2) an effective cure accelerating amount of piperazine, N-aminoethylpiperazine or mixture thereof.

This system demonstrates a rapid cure, high lap shear strength and relatively high peel strength. These qualities are effective for use as adhesives. The formulation comprising triethyleneglycol diamine is particularly preferred.

DESCRIPTION OF THE PREFERRED EMBODIMENTS

Two epoxy adhesive formulations have been discovered which demonstrate rapid cure, high lap shear strength and relatively high peel strength. The formulation comprises liquid epoxy resin diluted with acrylate ester, an adhesion promoting additive, an amine curing agent and a cure accelerating composition.

Generally the vicinal polyepoxide containing compositions which may be cured with the products of the invention are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight of 150 to 250. Preferably the base resin, which has an epoxide equivalent weight of from 175 to 195, is derived from condensing epichlorohydrin with 2,2-bis(p-hydroxyphenyl)propane to form 2,2-bis[(p-2,3 epoxy propoxy) phenyl]propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethyl methane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be coreacted with an epihalohydrin to provide these epoxy polyethers are such compounds as resorcinol, hydroquinone, substituted hydroquinones, e.g., methylhydroquinone, and the like.

Among the polyhydric alcohols which can be coreacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be cured by the products of the invention in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

The polyoxypropylene diureide having a molecular weight of 2000-3000 may be described by the formula:

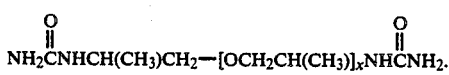

This diureide is produced by reacting a diamine of the formula:

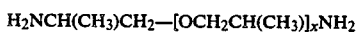

wherein x is about 33.1, with two moles of urea. The diamine is available commercially as JEFFAMINE ® D-2000. The diureide is available commercially as JEFFAMINE ® BuD-2000.

The amine cured resins having superior adhesion in accordance with the instant invention are prepared in a conventional manner. The amine curing agent combination is admixed with the polyepoxide composition in amounts according to the amine equivalent weight of the curing agent combination employed. Generally the number of equivalents of amine groups is from about 0.8 to about 1.2 times the number of epoxide equivalents present in the curable epoxy resin composition, with a stoichiometric amount being preferred. In the instant invention about 21 to 23 parts by weight triethyleneglycol diamine or about 30 to 33 parts by weight tetraethyleneglycol diamine has been determined to be an effective curing amount. When an accelerator is used, amounts from 1 to about 15 parts by weight based on 100 parts by weight of the resin are generally satisfactory. The exact amount of constituents in accordance with the above general requirements will depend primarily on the application for which the cured resin is intended.

The diureide and triacrylate are incorporated into the uncured resin by admixing. The curing agent and accelerator are admixed separately. The constituents forming the curable material are then intimately admixed by standard methods.

Although all of the epoxy resins disclosed herein are generally useful in accordance with the instant invention concept, those based on aliphatic compounds are preferably not used exclusively. The presence of resins containing polyglycidyl ethers of polyhydric phenols in amounts greater than 50% by weight of the resin constituent, and more preferably 80% by weight has been shown to greatly enhance the desirable properties of the cured material, especially the adhesive strength.

Generally, the mixture of epoxy resin, the polyether diureide, the triacrylate, the polyethyleneglycol diamine and the accelerator combination is allowed to self-cure at ambient temperatures of between 0° C. to about 45° C. The data shows that excellent adhesive properties are developed at room temperature of about 25° C.

According to a greatly preferred embodiment, resins of the polyglycidyl ether of polyhydric phenol type incorporating therein 8 to 16 parts by weight trimethylolpropane triacrylate and 5 to 15 parts by weight of the urea terminated polyoxyalkylenepolyamine having a molecular weight of about 2000; are cured with a stoichiometric amount of tri- or tetraethyleneglycol diamine and from 1 to 10 parts by weight percent based on 100 parts by weight of the resin of an accelerator comprising an admixture of piperazine, N-aminoethylpiperazine and triethanolamine. The composition is cured at room temperature to produce products having superior adhesive strength in accordance with the instant invention.

It will further be realized that various conveniently employed additives can be admixed with the adhesive composition prior to final cure. For example, pigments, dyes, fillers, flame retarding agents and the like may be added to produce a custom formulation for a particular end use.

Furthermore, although not preferred, known solvents for polyepoxide, materials such as toluene, benzene, xylene, dioxane, ethylene glycol monomethylether and the like can be used. Polyepoxide resins containing the additives can be used in any of the applications for which polyepoxides are customarily used. The compositions of the instant invention can be used most importantly, as adhesives.

The formulations effective in bringing about the increased adhesion and peel strength properties were discovered empirically as demonstrated in the example. Particularly, trimethylolpropanetriacrylate was found to speed cure rate and impart flexibility to the cured adhesive.

The following examples illustrate the nature of the instant invention but are not intended to be limitative thereof.

EXAMPLE 1

| Adhesive Properties of Systems Containing Epoxy Resins and an Aliphatic Amine | | | | | |
|---|---|---|---|---|---|
| | −33 A | −33 B | −33 C | −33 D | −33 E |
| Formulation, pbw (6170) | | | | | |
| Liquid epoxy resin (EEW 188) | 90 | 70 | 50 | 30 | 10 |
| EPI-REZ ® 50727 | 10 | 30 | 50 | 70 | 90 |
| Triethyleneglycol diamine | 20.9 | 22.3 | 23.7 | 25.1 | 26.4 |
| Adhesion Properties | | | | | |
| after 24 hrs 25° C. | | | | | |
| Tensile shear strength, psi | — | — | — | — | 790 |
| T-peel strength, pli | — | — | — | — | 11.5 |
| after 7 days 25° C. | | | | | |
| Tensile shear strength, psi | 1300 | 1600 | 2200 | 3000 | 3400 |
| T-peel strength, pli | * | 3.5 | 3.5 | 4.4 | 5.6 |

*Test Samples broke apart before testing

Although properties of Formulation 6170-33E are good after a 7-day cure, strength properties are very low after a 24-hr. cure.

EXAMPLE 2

| Adhesion Properties of Formulated Systems | | | | |
|---|---|---|---|---|
| | −42A | −42B | −42C | −42D |
| Formulation, pbw (6170) | | | | |
| Liquid epoxy resin (EEW 188) | 80 | 60 | 40 | 20 |
| EPI-REZ ® 50727 | 20 | 40 | 60 | 80 |
| JEFFAMINE BuD ®-2000 | 10 | 10 | 10 | 10 |
| Triethyleneglycol diamine | 21 | 23 | 24 | 26 |
| Accelerator 399 | 5 | 5 | 5 | 5 |
| Adhesion Properties | | | | |
| after 6 hrs. 25° C. | | | | |
| Tensile shear strength, psi | 1300 | 400 | — | — |
| T-peel strength, pli | 12.2 | 25.8 | — | — |
| after 16 hrs. 25° C. | | | | |
| Tensile shear strength, psi | 3700 | 3300 | — | — |
| T-peel strength, pli | 8.3 | 9.9 | — | — |
| after 24 hrs. 25° C. | | | | |
| Tensile shear strength, psi | 3700 | 3200 | 2800 | 2500 |
| T-peel strength, pli | 6.9 | 6.9 | 8.8 | 10.8 |
| after 7 days 25° C. | | | | |
| Tensile shear strength, psi | 4000 | 3500 | — | — |
| T-peel strength, pli | 10.0 | 4.8 | — | — |

These systems develop excellent adhesive properties in less than 16 hours at normal room temperature (25° C.).

EXAMPLE 3

| Effect of Other Additives on Adhesive Properties | | | | |
|---|---|---|---|---|
| | A | B | C | D |
| Formulation, pbw | | | | |
| Liquid epoxy resin (EEW 188) | 80 | 60 | 40 | 20 |
| EPI-REZ ® 50727 | 20 | 40 | 60 | 80 |
| Additive | 10 | 10 | 10 | 10 |
| Triethyleneglycol diamine | ←a curing amount→ | | | |
| Accelerator 399 | 5 | 5 | 5 | 5 |
| Adhesive Properties | | | | |
| after 24 hrs. 25° C. | | | | |
| Additive = JEFFAMINE ® BuD-2000 (6170-42) | | | | |
| Tensile shear strength, psi | 3700 | 3200 | 2800 | 2500 |
| T-Peel strength, pli | 6.9 | 6.9 | 8.8 | 10.8 |
| Additive = JEFFAMINE ® T-5000 (6170-55) | | | | |
| Tensile shear strength, psi | 2800 | 3100 | 3000 | 2400 |
| T-Peel strength, pli | 10.1 | 5.4 | 7.5 | 8.8 |
| Additive = JEFFAMINE ® D-2000 (6170-53) | | | | |
| Tensile shear strength, psi | 3700 | 3100 | 2300 | 430 |
| T-Peel strength, pli | 4.6 | 7.0 | 4.3 | 7.3 |
| Additive = JEFFAMINE ® DU-700 (6170-58); 20 pbw instead of 10 pbw | | | | |
| Tensile shear strength, psi | 2900 | 2200 | 1600 | 1000 |
| T-Peel strength, pli | 3.7 | 9.0 | 13.0 | 14.0 |

JEFFAMINE ® BuD-2000 gives the best combination of sheer strength and peel strength.

EXAMPLE 4

| Adhesive Properties and Curing Characteristics of Systems Containing Epoxy Resins and an Aliphatic Amine | | | | |
|---|---|---|---|---|
| | −82A | −82B | −82C | −82D |
| Formulation, pbw (6170) | | | | |
| Liquid epoxy resin (EEW 188) | 80 | 60 | 40 | 20 |
| EPI-REZ ® 50727 | 20 | 40 | 60 | 80 |
| Tetraethyleneglycol diamine | 30.2 | 32.1 | 34.0 | 35. |
| Adhesion Properties | | | | |
| after 7 days 25° C. | | | | |
| Tensile shear strength, psi | 4000 | 4100 | 4000 | 3000 |
| T-Peel strength, pli | 6.3 | 5.4 | 4.4 | 9.1 |
| Drying time, hrs | | | | |
| set to touch | 3.6 | 3.9 | 0.7 | 0.2 |
| surface dry | 5.7 | 4.6 | 2.1 | 0.5 |
| thru dry | 10.8 | 9.6 | 9.5 | 4.2 |

EXAMPLE 5

| Adhesion Properties and Curing Characteristics of Adhesive Systems | | | | |
|---|---|---|---|---|
| | −73A | −73B | −73C | −73D |
| Formulation, pbw (6170) | | | | |
| Liquid epoxy resin (EEW 188) | 80 | 60 | 40 | 20 |
| EPI-REZ ® 50727 | 20 | 40 | 60 | 80 |
| JEFFAMINE ® BuD-2000 | 10 | 10 | 10 | 10 |
| Tetraethyleneglycol diamine | 30.2 | 32.1 | 34.0 | 35.9 |
| Accelerator 399 | 5 | 5 | 5 | 5 |
| Adhesion Properties | | | | |
| after 8 hrs 25° C. | | | | |
| Tensile shear strength, psi | 360 | 160 | — | — |
| T-Peel strength, pli | 17.2 | 10.6 | — | — |
| after 16 hrs 25° C. | | | | |
| Tensile shear strength, psi | 2300 | 1700 | — | — |
| T-Peel strength, pli | 16.7 | 26.7 | — | — |
| after 24 hrs 25° C. | | | | |
| Tensile shear strength, psi | 3500 | 2700 | 2100 | 1200 |
| T-Peel strength, pli | 11.3 | 15.8 | 23.5 | 27.1 |
| after 7 days 25° C. | | | | |
| Tensile shear strength, psi | 3500 | 3500 | 3100 | 2000 |
| T-Peel strength, pli | 10.3 | 10.7 | 11.6 | 9.6 |
| Drying time, hrs | | | | |
| set to touch | 2.5 | 2.1 | 1.5 | — |
| surface dry | 3.6 | 3.3 | 2.6 | 0.5 |
| thru dry | 6.3 | 4.4 | 3.7 | 2.5 |

EXAMPLE 6

| Effects of Other Curing Agents on Adhesion Properties | | | | |
|---|---|---|---|---|
| | A | B | C | D |
| Resin Blends, pbw | | | | |
| Liquid epoxy resin (EEW 188) | 80 | 60 | 40 | 20 |
| EPI-REZ 50727 | 20 | 40 | 60 | 80 |

-continued

Effects of Other Curing Agents on Adhesion Properties

| | A | B | C | D |
|---|---|---|---|---|
| JEFFAMINE BuD-2000 | 10 | 10 | 10 | 10 |
| Adhesive Properties | | | | |
| Curative = Triethylenetetramine (6170-69) | | | | |
| Curative Conc., pbw after 24 hrs 25° C. | 13.8 | 14.7 | 15.6 | 16.5 |
| Tensile shear strength, psi | 2300 | 3000 | 3200 | 2200 |
| T-Peel strength, pli | 4.7 | 3.9 | 3.2 | 3.7 |
| after 7 days 25° C. | | | | |
| Tensile shear strength, psi | 3400 | 3200 | 1900 | 3100 |
| T-Peel strength, pli | 5.0 | 4.1 | * | 4.0 |
| Curative = Polyamide (Amine value 370–400) (6170-70) | | | | |
| Curative Conc., pbw after 24 hrs 25° C. | 56 | 59 | 63 | 66 |
| Tensile shear strength, psi | 1200 | 460 | 440 | 330 |
| T-Peel strength, pli | 23.4 | 17.2 | 15.2 | 9.8 |
| after 7 days 25° C. | | | | |
| Tensile shear strength, psi | 3200 | 2800 | 2900 | 2600 |
| T-Peel strength, pli | 9.9 | 10.2 | 10.6 | 10.3 |
| Curative = JEFFAMINE D-230 (6170-71), with 5 pbw Accelerator 399 | | | | |
| Curative Conc., pbw after 24 hrs 25° C. | 34 | 36 | 39 | 41 |
| Tensile shear strength, psi | 1500 | 630 | 270 | 170 |
| T-Peel strength, pli | 10.2 | 10.9 | 8.4 | 2.6 |
| after 7 days 25° C. | | | | |
| Tensile shear strength, psi | 3000 | 2200 | 1900 | 2100 |
| T-Peel strength, pli | 6.8 | 6.2 | 3.1 | 2.6 |
| Curative = JEFFAMINE D-400 (6170-72), with 5 pbw Accelerator 399 | | | | |
| Curative Conc., pbw after 48 hrs 25° C. | 57 | 61 | 64 | 68 |
| Tensile shear strength, psi | 440 | 120 | 90 | 80 |
| T-Peel strength, pli | 13.8 | 7.2 | 5.2 | 3.5 |
| after 7 days 25° C. | | | | |
| Tensile shear strength, psi | 1900 | 1100 | 770 | 270 |
| T-Peel strength, pli | 10.0 | 13.0 | 10.1 | 7.2 |

*Test sample broke before testing

Although most of these other curing agents offered adequate adhesive properties after a 7 day ambient cure, they did not cure rapidly.

TABLE OF TEST METHODS

| | |
|---|---|
| T-peel strength (pli) | ASTM D-1876 |
| Tensil shear strength (psi) | ASTM D-1002 |

TABLE OF COMPOUNDS

EPI-REZ® 50727 is a blend of 40% trimethylolpropanetriacrylate and 60% of a bisphenol A epoxy resin.

JEFFAMINE® BuD-2000 is the polyoxypropylene diureide having a molecular weight of 2000–3000 described by the formula:

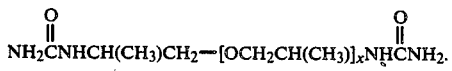

NH₂CNHCH(CH₃)CH₂—[OCH₂CH(CH₃)]ₓNHCNH₂.

JEFFAMINE® D-230, D-400 and D-2000 are represented by the structure:

H₂NCH(CH₃CH₂—[OCH₂CH(CH₃)]ₓNH₂ wherein:

| JEFFAMINE® | x(approx.) |
|---|---|
| D-2000 | 33.1 |
| D-400 | 5.6 |
| D-230 | 2.6 |

JEFFAMINE® T-403 is represented by the structure:

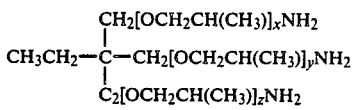

wherein x+y+z averages 5.3.

The use of these products as epoxy resin curing agents is described in U.S. Pat. No. 4,189,564.

Accelerator 399 is a blend of 10–20% piperazine, 5–10% N-aminoethylpiperazine and 65–80% triethanolamine.

JEFFAMINE® DU-700 is an amine represented by the formula:

[H₂NCH(CH₃)CH₂—[OCH₂CH(CH₃)]ₓNH-]₂—C=O wherein: x averages 5.6

JEFFAMINE® EDR-148 is triethyleneglycol diamine.

JEFFAMINE® EDR-192 is tetraethyleneglycol diamine.

While particular embodiments of the invention have been described, it is well understood that the invention is not limited thereto since modifications may be made. It is therefore contemplated to cover by the appended claims any such modifications that fall within the spirit and scope of the claims.

What is claimed is:

1. An adhesive comprising the cured reaction product of:
   A. An epoxy resin component comprising:
   1. 72 to 104 parts by weight of a vicinal polyepoxide having an average of at least 1.8 reactive 1,2-epoxy groups per molecule,
   2. 8 to 16 parts by weight trimethylolpropanetriacrylate
   3. 5 to 15 parts by weight of a polyoxypropylene diureide having a molecular weight of about 2000 to 3000, and
   B. A curative component comprising:
   1. a curing amount of triethyleneglycol diamine, and
   2. an effective cure accelerating amount of piperazine, N-aminoethylpiperazine or mixture thereof.

2. The adhesive of claim 1 wherein the polyoxypropylene diureide is of the formula:

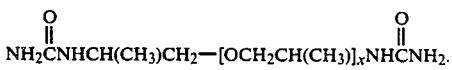

NH₂CNHCH(CH₃)CH₂—[OCH₂CH(CH₃)]ₓNHCNH₂.

3. An adhesive comprising the cured reaction product of:
   A. An epoxy resin component comprising:
   1. 72 to 104 parts by weight of a vicinal polyepoxide having an average of at least 1.8 reactive 1,2-epoxy groups per molecule, 2. 8 to 16 parts by weight trimethylolpropanetriacrylate.
3. 5 to 15 parts by weight of a polyoxypropylene diureide having a molecular weight of about 2000 to 3000, and B. A curative component comprising:
 1. a curing amount of tetraethyleneglycol diamine, and
 2. an effective cure acclerating amount of piperazine, N-aminoethylpiperazine or mixture thereof.

4. The adhesive of claim 3 wherein the polyoxypropylene diureide is of the formula:

$$\underset{\text{NH}_2\overset{\text{O}}{\overset{\|}{\text{C}}}\text{NHCH(CH}_3)\text{CH}_2-[\text{OCH}_2\text{CH(CH}_3)]_x\text{NH}\overset{\text{O}}{\overset{\|}{\text{C}}}\text{NH}_2}{}$$

* * * * *